United States Patent
Li et al.

(10) Patent No.: US 8,211,399 B2
(45) Date of Patent: Jul. 3, 2012

(54) METHOD FOR MAKING METAL SULFIDE NANOCRYSTALS

(75) Inventors: Ya-Dong Li, Beijing (CN); Qing Peng, Beijing (CN); Zhong-Bin Zhuang, Beijing (CN); Xiao-Tang Lu, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 34 days.

(21) Appl. No.: 12/858,563

(22) Filed: Aug. 18, 2010

(65) Prior Publication Data
US 2011/0311434 A1 Dec. 22, 2011

(30) Foreign Application Priority Data
Jun. 17, 2010 (CN) .......................... 2010 1 0202005

(51) Int. Cl.
C01B 17/20 (2006.01)

(52) U.S. Cl. ........................ 423/561.1; 977/773; 977/810

(58) Field of Classification Search ............... 423/561.1; 977/773, 810
See application file for complete search history.

(56) References Cited

U.S. PATENT DOCUMENTS
4,861,493 A * 8/1989 Jansen .......................... 210/715

OTHER PUBLICATIONS

Zhoug Bin,Zhuang et al. Tetrahedral Colloidal Crystals of Ag2S Nanocrystals; Angewandte Chemie International Edition;Sep. 20, 2007;pp. 8174-8177;vol. 46.

* cited by examiner

*Primary Examiner* — Timothy Vanoy
(74) *Attorney, Agent, or Firm* — Altis Law Group, Inc.

(57) ABSTRACT

A method for making metal sulfide nanocrystals is provided. First, some metal salt powders are provided in a container. Second, superfluous mercaptan is added into the container. Then the superfluous mercaptan and the metal salt are stirred uniformly to get a precursor mixture and the precursor mixture is heated to get the metal sulfide nanocrystals. Lastly, the metal sulfide nanocrystals are separated and washed.

20 Claims, 8 Drawing Sheets

Providing some metal salt powders in a container

Adding superfluous mercaptan into the container

Stirring the superfluous mercaptan and the metal salt uniformly to get a precursor mixture and heating the precursor mixture to get the metal sulfide nanocrystals Separating the metal sulfide nanocrystals and washing the metal sulfide nanocrystals for at least one time

METHOD FOR MAKING METAL SULFIDE NANOCRYSTALS

RELATED APPLICATIONS

This application claims all benefits accruing under 35 U.S.C. §119 from China Patent Application No. 201010202005.4, filed on Jun. 17, 2010 in the China Intellectual Property Office, the contents of which are hereby incorporated by reference.

BACKGROUND

1. Technical Field

The present invention relates to methods for making metal sulfide nanocrystals.

2. Description of Related Art

Nanocrystals are defined as nanometer sized single crystalline fragments of the corresponding bulk crystals. The term "nanometer-sized" is typically used to refer to particles with an approximate size range between about 1 nanometer (nm) to about 1000 nm in diameter. More typically, "nanometer-sized" refers to an approximate size range between about 1 nm to 100 nm in diameter. Metal sulfide nanocrystals play important roles in many different branches of science and technology, such as LED, solar cell, and electronic and optical devices.

Methods for making metal sulfide crystal have a critical role in the chemical field. Conventional methods for making metal sulfide nanocrystals include hot-injection method or thermal decomposition of organometallic compound, wherein high temperatures and protection gas are needed. These methods need organometallic compound as raw materials, which is expensive. As such, the conventional methods for making the metal sulfide nanocrystals are complicated and expensive.

What is needed, therefore, is a method for making the metal sulfide nanocrystals that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
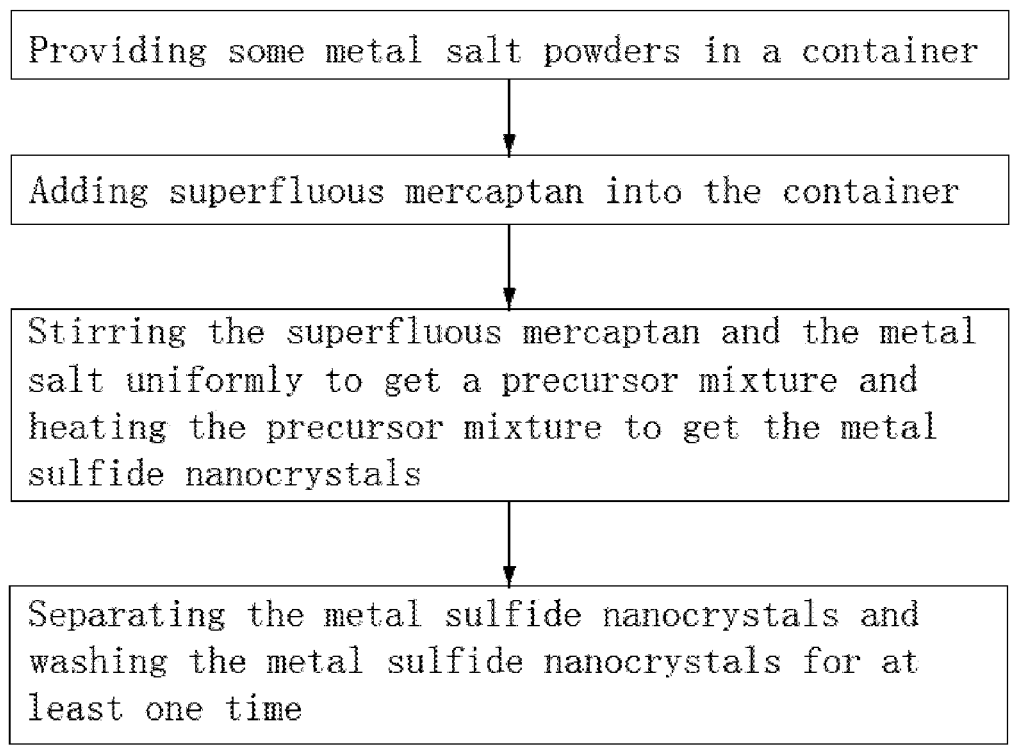
FIG. 1 is a flow chart of a method according to one embodiment for making metal sulfide nanocrystals.

Referring to FIG. 1, a method for making metal sulfide nanocrystals according to one embodiment is shown. The method includes the following steps:

S1: providing some metal inorganic salt powders in a container;

S2: adding superfluous mercaptan into the container;

S3: stirring the superfluous mercaptan and the metal inorganic salt uniformly to get a precursor mixture and heating the precursor mixture to get the metal sulfide nanocrystals; and, S4: separating the metal sulfide nanocrystals and washing the metal sulfide nanocrystals at least one time.

In step S1, the metal in the metal inorganic salt is the same as the metal in the metal sulfide nanocrystals. The metal inorganic salt can be metal sulfate, metal acetates, metal nitrate and metal chloride, such as silver nitrate, copper sulfate, copper chloride, lead acetates, ferrous sulfate or zinc sulfate.

In step S2, the mercaptan should be in a liquid state, and the chemical formula of the mercaptan can be $C_nH_{n+2}S$, wherein $7 \leq n \leq 18$. The mercaptan should be superfluous compared with the metal inorganic salt, that is, if the valence of the metal ions in the metal inorganic salt is +N, the molar ratio between the mercaptan and the metal inorganic salt should be larger than N. For example, in lead acetates, the valence of the lead ions is +2, and the molar ratio between the mercaptan and the lead acetates should be larger than 2. Particularly, the molar ratio between the mercaptan and the metal salt is larger than 10.

In step S2, the mercaptan can also be added with an accessorial solvent, such as octadecene, diphenyl ether, oleic acid, oleylamine, and trioctylphosphane. A volume ratio between the mercaptan and the accessorial solvent can be in a range from about 1:10 to about 4:1. The accessorial solvent can be used to change the shape of the metal sulfide nanocrystals.

In step S3, the superfluous mercaptan and the metal inorganic salt can be stirred by magnetic stirring method, mechanical stirring method, or ultrasonic vibration method. After being stirred, the metal inorganic salt can be dispersed uniformly in the superfluous mercaptan to form the precursor mixture. The precursor mixture can be heated by an electromagnetic furnace to a temperature from about 100° C. to about 300° C. and the temperature is kept for about 5 minutes to about 1 hour. In one embodiment, the stirring step and the heating step can be carried out at the same time. In the step S3, after the temperature of the precursor mixture gets higher than 100° C., the metal inorganic salt chemically reacts with the superfluous mercaptan to form thiolate at first, then the thiolate is decomposed to metal sulfide. A number of metal sulfide crystal nucleus is formed. Because the mercaptan is superfluous, the mercaptan that does not chemically react with the metal inorganic salt would wrap the outer surface of the metal sulfide crystal nucleus and prevent the metal sulfide crystal nucleus from growing larger. As such, a number of metal sulfide nanocrystals are formed. After the chemical reaction between the metal inorganic salt and the mercaptan, the metal sulfide nanocrystals are disposed in the mercaptan in the container. The container can be cooled to a room temperature after the number of metal sulfide nanocrystals is formed.

In step S4, metal sulfide nanocrystals is separated by the following sub-steps:

S4a1: adding a polar solvent into the container to get a mixture including metal sulfide nanocrystals, mercaptan and polar solvent;

S4a2: stirring the mixture uniformly; and

S4a3: separating the mixture by centrifugal method, the metal sulfide nanocrystals being separated from the mixture. After that, the metal sulfide nanocrystals are washed by the polar solvent at least once. The method for washing the metal sulfide nanocrystals includes the following sub-steps:

S4b1: adding the metal sulfide nanocrystals into the polar solvent;

S4b2: stirring the metal sulfide nanocrystals and the polar solvent; and

S4b3: separating the metal sulfide nanocrystals and the polar solvent by centrifugal method, the metal sulfide nanocrystals being separated from the polar solvent. The polar solvent can be water, methyl alcohol, ethanol, or propyl alcohol.

The present method for making metal sulfide nanocrystals is further illustrated by the following examples, which show the detailed conditions such as a ratio between the metal salt and mercaptan, whether the accessorial solvent is added or not, and the temperature of the chemical reaction, would affect the shape and the size.

EXAMPLE 1

Figure 2:
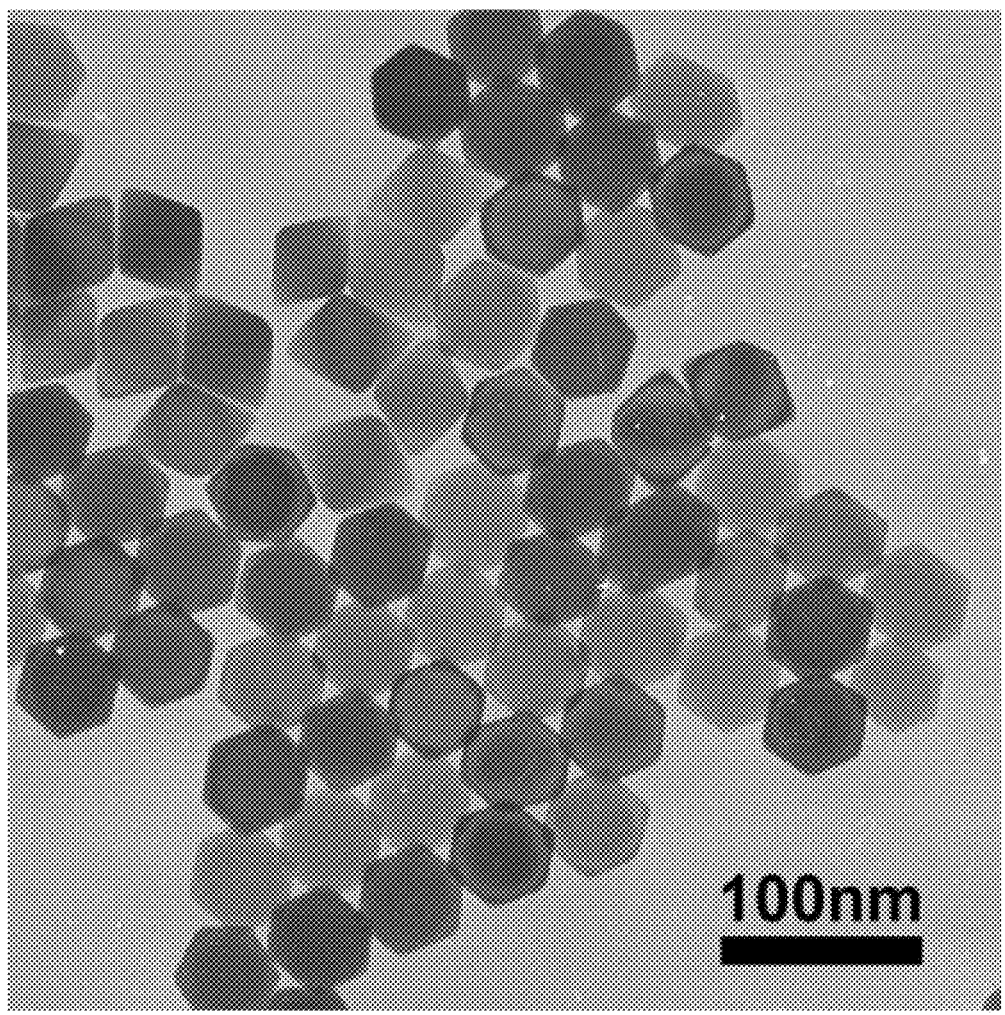
FIG. 2 is a Transmission Electron Microscope (TEM) of lead sulfide nanocrystals according to example 1.
Figure 3:
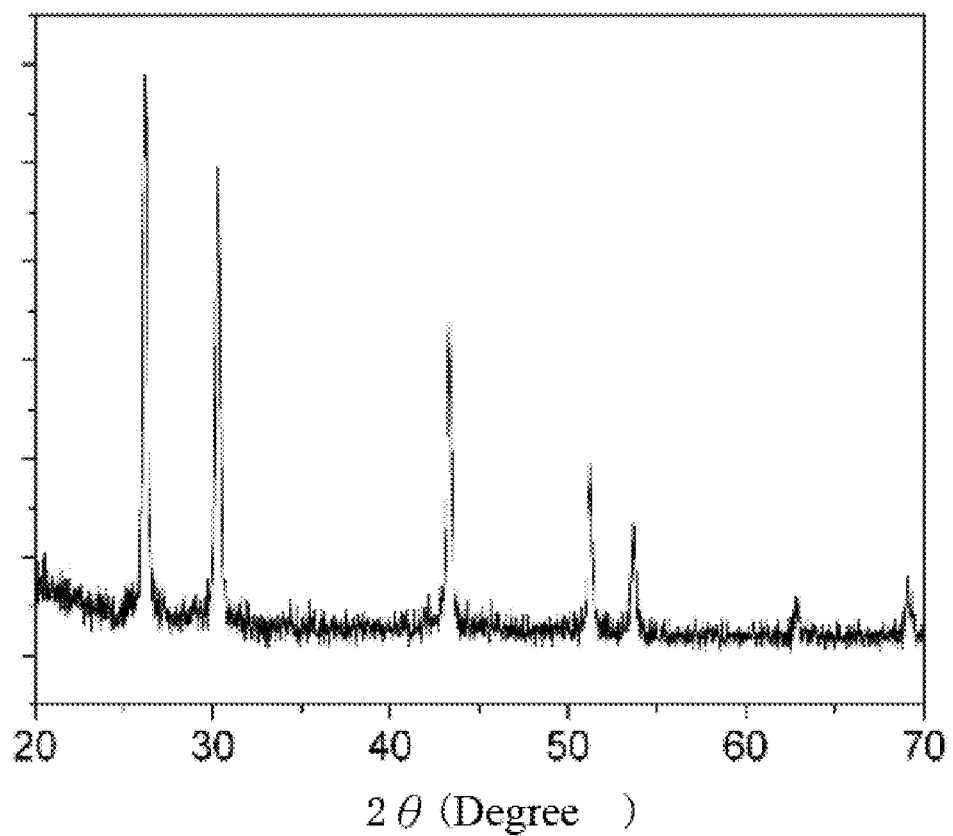
FIG. 3 is an X-ray diffraction pattern of the lead sulfide nanocrystals in FIG. 2.

The metal inorganic salt is lead acetate, and the weight of the lead acetate is about 0.4 g, a volume of the mercaptan is about 10 ml. The precursor mixture including the lead acetate and the mercaptan is stirred for about 5 minutes, creating a suspension. The precursor mixture is heated to a temperature about 220° C. for about 10 minutes, and lead sulfide nanocrystals are formed. The lead sulfide nanocrystals are separated and are washed by ethanol about three times. FIG. 2 shows the shape and size of the lead sulfide nanocrystals. The shape of the lead sulfide nanocrystals is octahedron or tetrahedron. A side of one lead sulfide nanocrystal is about 40 nanometers. FIG. 3 shows that the lead sulfide nanocrystals have good purity.

EXAMPLE 2

Figure 4:
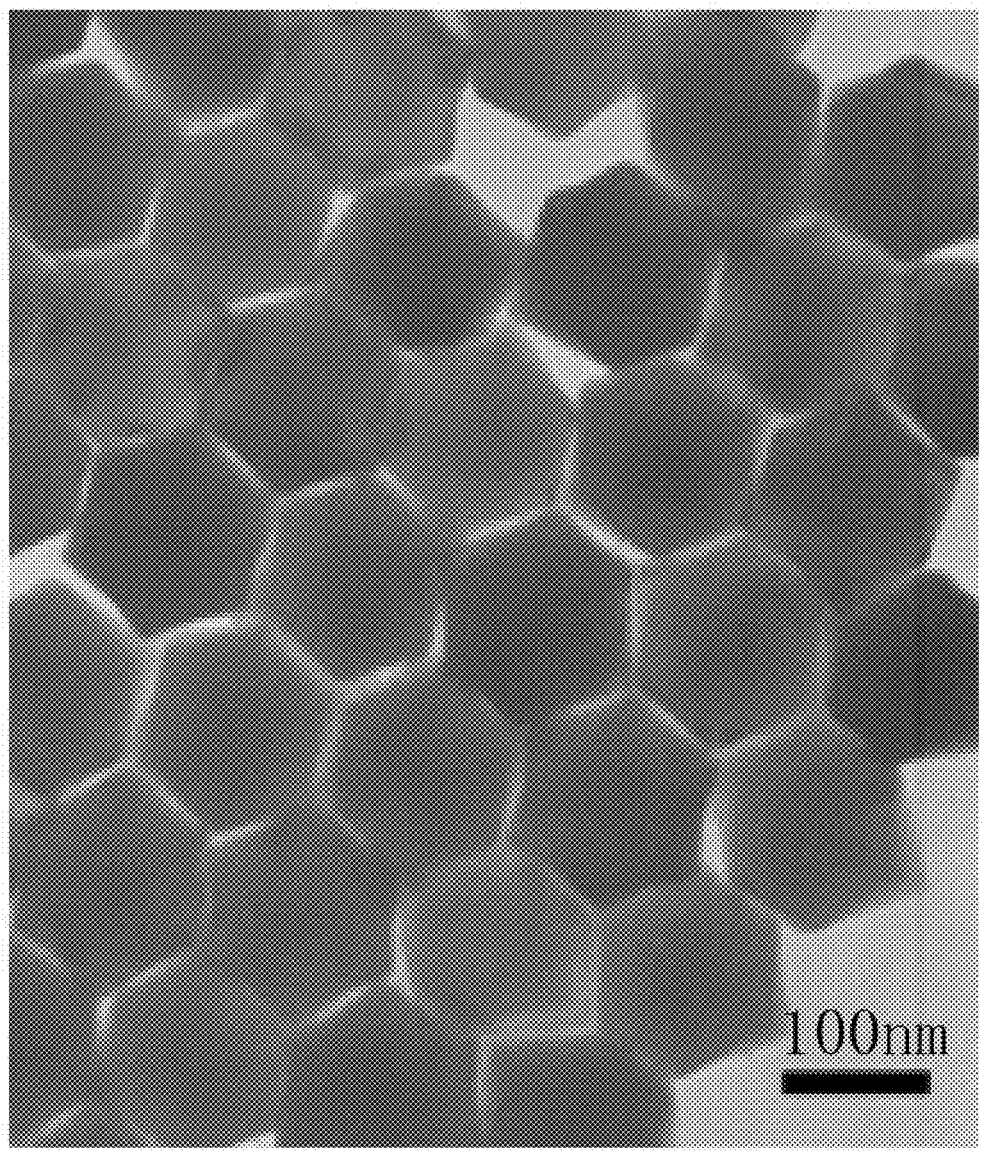
FIG. 4 is a TEM of lead sulfide nanocrystals according to example 2.

The metal inorganic salt is lead acetate, the weight of the lead acetate is about 1 g, and a volume of the mercaptan is about 10 ml. The other conditions are the same as in example 1. FIG. 4 shows the shape and size of the lead sulfide nanocrystals. The shape of the lead sulfide nanocrystals is hexahedron and a side of one lead sulfide nanocrystal is about 80 nanometers.

EXAMPLE 3

Figure 5:
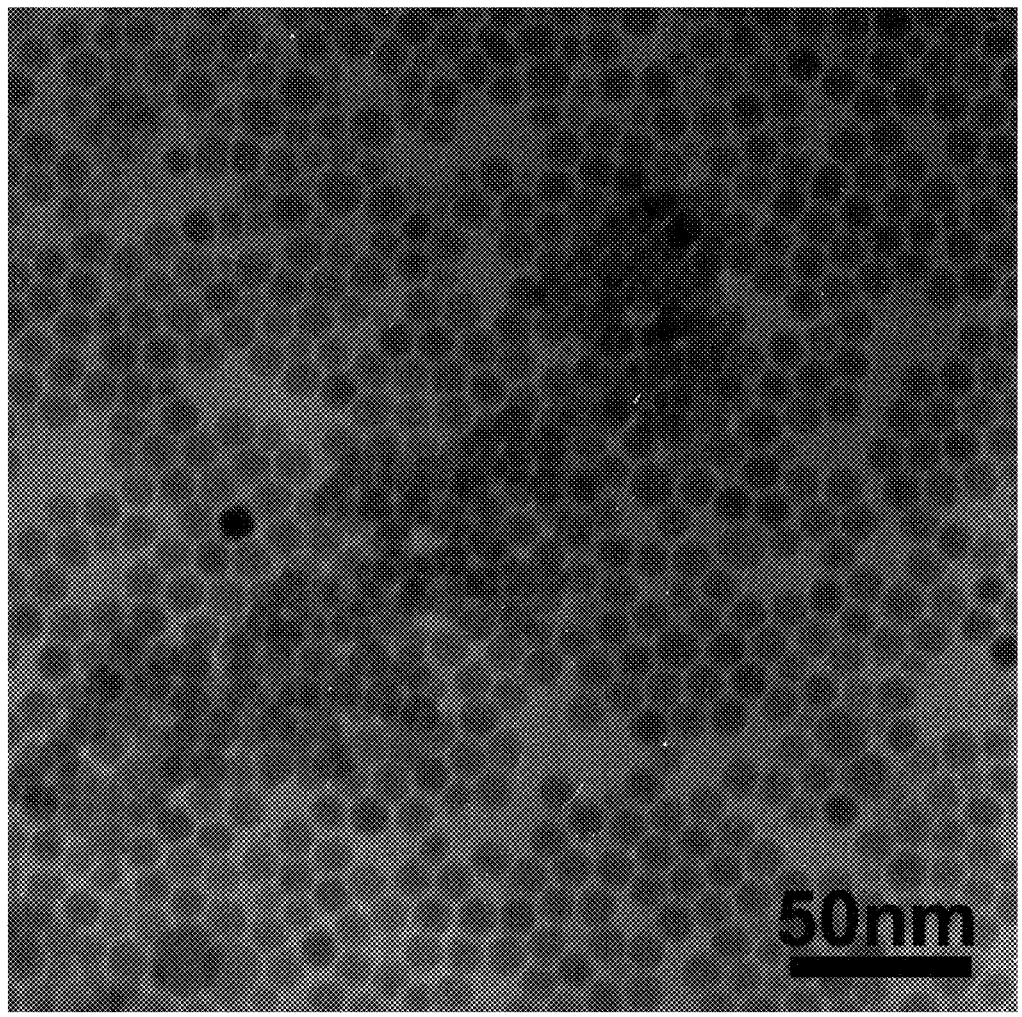
FIG. 5 is a TEM of copper sulfide nanocrystals according to example 3.
Figure 6:
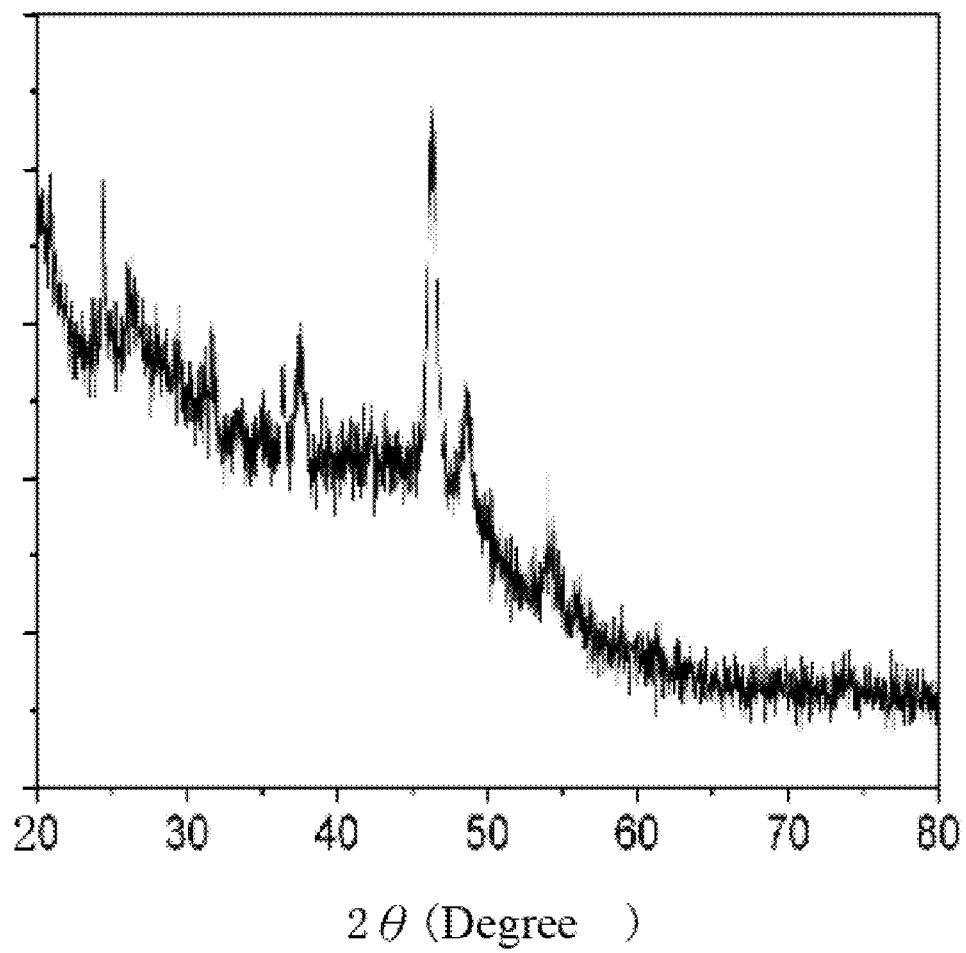
FIG. 6 is an X-ray diffraction chart of the lead sulfide nanocrystals in FIG. 2.

The metal inorganic salt is copper acetate, the weight of the copper acetate is about 0.2 g, and a volume of the mercaptan is about 10 ml. The other conditions are the same as in example 1. FIG. 5 shows the shape and size of the copper sulfide nanocrystals. The shape of the copper sulfide nanocrystals is almost round. FIG. 6 shows that the copper sulfide nanocrystals have good purity.

EXAMPLE 4

Figure 7:
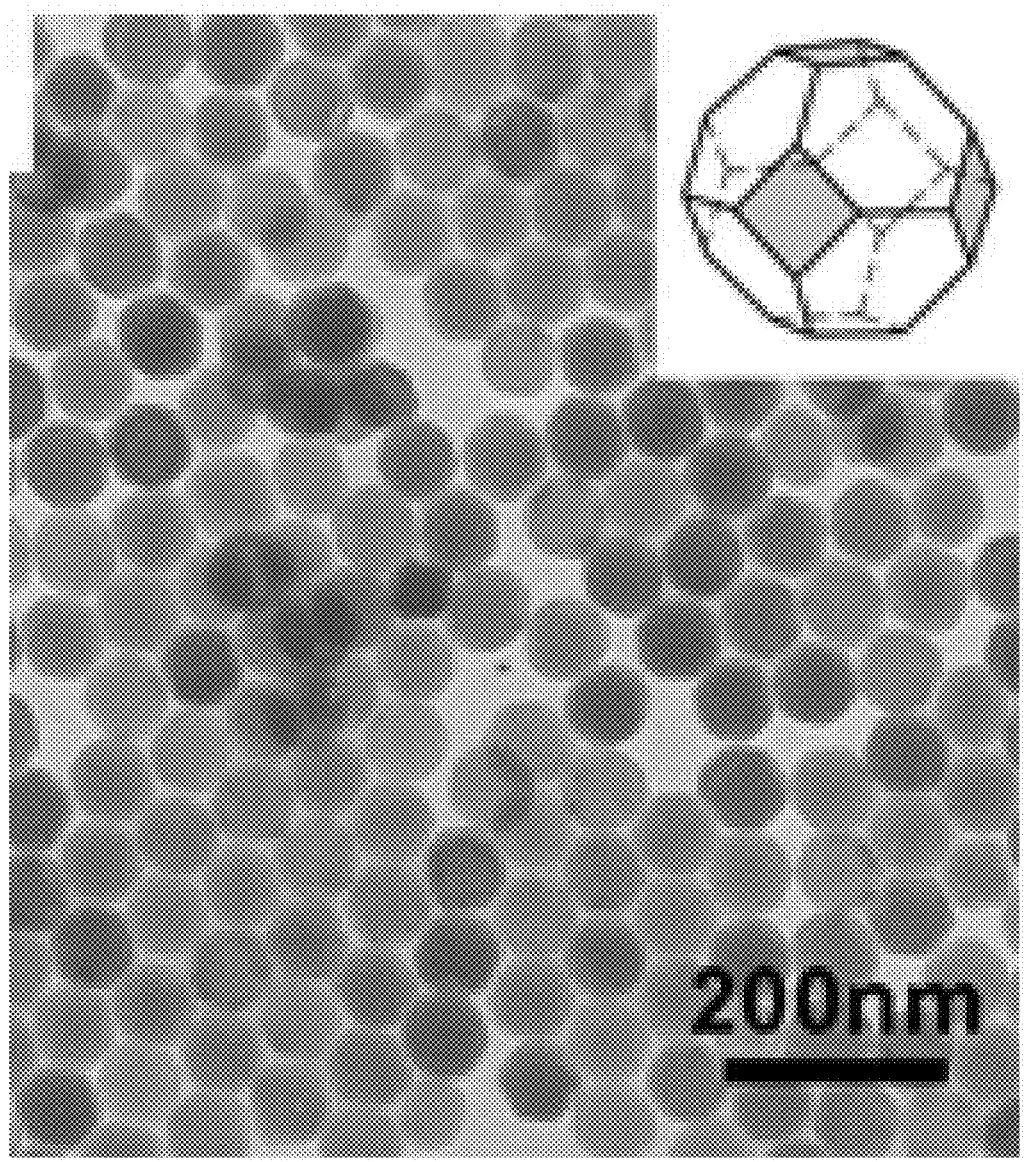
FIG. 7 is a TEM of lead sulfide nanocrystals according to example 4.

The metal inorganic salt is lead acetate, and the weight of the lead acetate is about 0.4 g, a volume of the mercaptan is about 8 ml. The accessorial solvent is added with the mercaptan. The accessorial solvent is about 2 ml oleic acid. The other conditions are the same as in example 1. FIG. 7 shows the shape and size of the lead sulfide nanocrystals. The shape of the lead sulfide nanocrystals is polyhedron and a size of one lead sulfide nanocrystal is about 60 nanometers.

EXAMPLE 5

Figure 8:
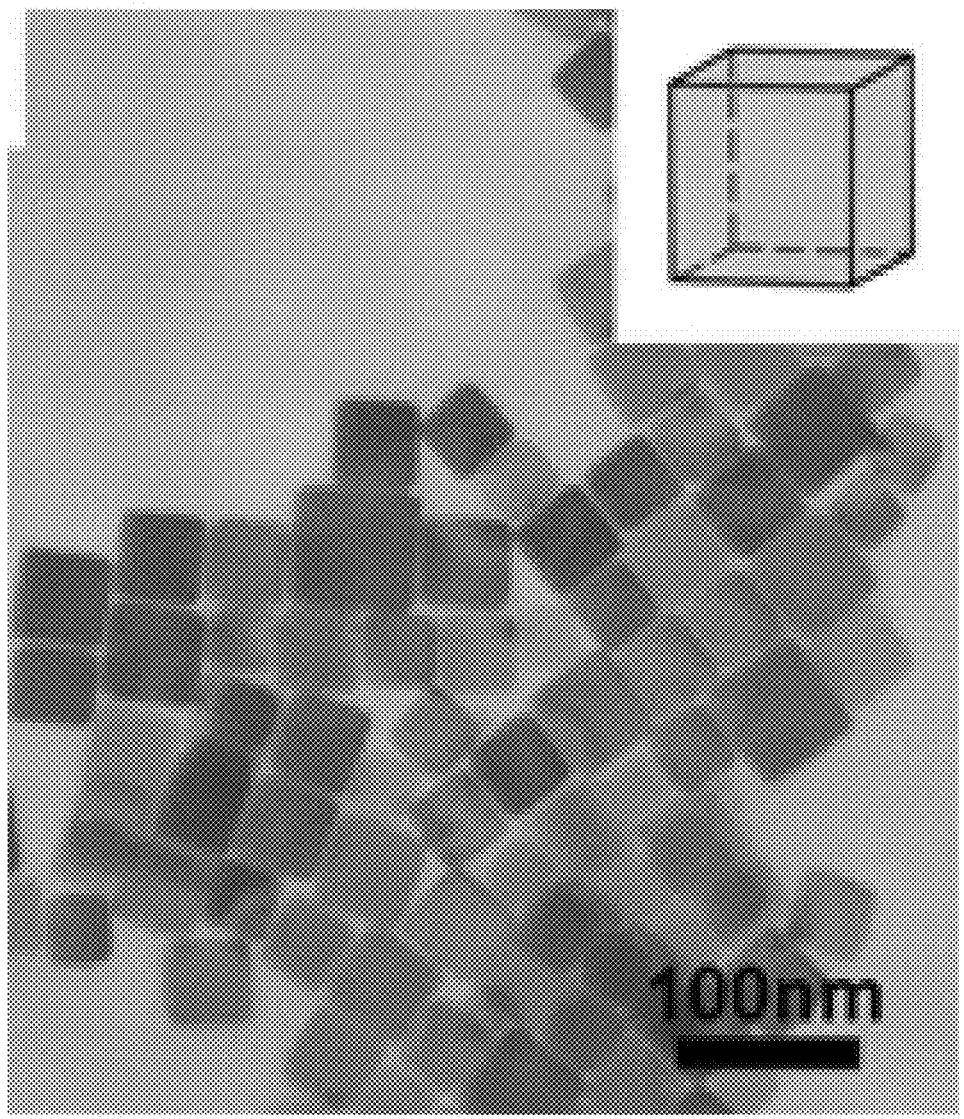
FIG. 8 is a TEM of lead sulfide nanocrystals according to example 5.

The metal inorganic salt is lead acetate, the weight of the lead acetate is about 0.4 g, and a volume of the mercaptan is about 5 ml. The accessorial solvent is added with the mercaptan. The accessorial solvent is oleic acid and a volume of the oleic acid is about 5 ml. The precursor mixture including the lead acetate, the mercaptan, and the oleic acid is heated to a temperature about 240° C. The other conditions are the same as in example 4. FIG. 8 shows the shape and size of the lead sulfide nanocrystals. The shape of the lead sulfide nanocrystals is cubic and a side of one lead sulfide nanocrystal is about 40 nanometers.

The method for making metal sulfide nanocrystals disclosed here has the following advantages: first, the metal inorganic salt and mercaptan are used as raw materials, and the raw materials have lower cost; secondly, in the process of making the metal sulfide nanocrystals, no protection gas is needed, and the method is simple.

It is to be understood that the above-described embodiments are intended to illustrate rather than limit the disclosure. Variations may be made to the embodiments without departing from the spirit of the embodiments as claimed. The above-described embodiments illustrate, but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What claimed is:

1. A method for making metal sulfide nanocrystals comprising:
    providing metal inorganic salt powder in a container;
    adding superfluous mercaptan into the container;
    stirring the superfluous mercaptan and the metal inorganic salt uniformly to obtain a precursor mixture and heating the precursor mixture to obtain the metal sulfide nanocrystals; and
    separating the metal sulfide nanocrystals.

2. The method of claim 1, wherein the metal salt is selected from the group consisting of metal sulfate, metal acetates, metal nitrate, and metal chloride.

3. The method of claim 1, wherein a molar ratio between the mercaptan and the metal salt is larger than about 10.

4. The method of claim 1, wherein an accessorial solvent is added into the container after the superfluous mercaptan is added, the accessorial solvent being selected from the group consisting of octadecene, diphenyl ether, oleic acid, oleylamine, and trioctylphosphane.

5. The method of claim 4, wherein a volume ratio between the mercaptan and the accessorial solvent is in a range from about 1:10 to about 4:1.

6. The method of claim 1, wherein the chemical formula of the mercaptan is $C_nH_{n+2}S$, and $7 \leq n \leq 18$.

7. The method of claim 1, wherein the precursor mixture is heated to a temperature from about 100° C. to about 300° C.

8. The method of claim 7, wherein the temperature is maintained for about 5 minutes to about 1 hour.

9. The method of claim 1, wherein the mercaptan and the metal salt are stirred by a magnetic stirring method, mechanical stirring method, or ultrasonic vibration method.

10. The method of claim 1, further comprising a step of cooling the precursor mixture to a room temperature after the metal sulfide nanocrystals are formed.

11. The method of claim 1, wherein the step of separating metal sulfide nanocrystals comprises substeps of: adding a polar solvent into the container to obtain a mixture including the metal sulfide nanocrystals, mercaptan, and polar solvent; stirring the mixture uniformly; and separating the mixture by a centrifugal method, thereby separating the metal sulfide nanocrystals from the mixture.

12. The method of claim 1, further comprising a step of washing the metal sulfide nanocrystals with a polar solvent after the metal sulfide nanocrystals are separated.

13. The method of claim 12, wherein the step of washing the metal sulfide nanocrystals comprises substeps of: adding the metal sulfide nanocrystals into the polar solvent; stirring the metal sulfide nanocrystals and the polar solvent; and separating the metal sulfide nanocrystals and the polar solvent by centrifugal method.

14. The method of claim 13, wherein the polar solvent is selected from the group consisting of water, methyl alcohol, ethanol, and Propyl alcohol.

15. The method of claim 1, wherein the metal sulfide nanocrystals are washed three times after being separated.

16. A method for making metal sulfide nanocrystals comprising:
   providing some metal salt powders in a container;
   adding superfluous mercaptan into the container, and stirring the superfluous mercaptan and the metal salt powders uniformly to obtain a precursor mixture;
   heating the precursor mixture to a temperature from about 100° C. to about 300° C. and obtaining the metal sulfide nanocrystals; and
   separating the meta sulfide nanocrystals.

17. The method of claim 16, wherein a molar ratio between the mercaptan and the metal salt powders is larger than about 10.

18. The method of claim 16, wherein an accessorial solvent is added into the container after the superfluous mercaptan is added; the accessorial solvent is selected from the group consisting of octadecene, diphenyl ether, oleic acid, oleylamine, and trioctylphosphane; a volume ratio between the mercaptan and the accessorial solvent is in a range from about 1:10 to about 4:1.

19. A method for making metal sulfide nanocrystals comprising:
   providing some metal salt powders in a container;
   adding superfluous mercaptan into the container, and stirring the superfluous mercaptan and the metal salt powders uniformly to obtain a precursor mixture;
   heating the precursor mixture to a temperature from about 100° C. to about 300° C. and keeping the temperature for about 5 minutes to about 1 hour to obtain the metal sulfide nanocrystals; and
   separating the metal sulfide nanocrystals and washing the metal sulfide nanocrystals for at least one time with a polar solvent.

20. The method of claim 19, wherein the chemical formula of the mercaptan is $C_nH_{n+2}S$, and $7 \leq n \leq 18$.

* * * * *